United States Patent
Marshall et al.

(10) Patent No.: US 10,380,652 B1
(45) Date of Patent: Aug. 13, 2019

(54) METHOD AND SYSTEM FOR PROVIDING A HOME DATA INDEX MODEL

(75) Inventors: Kevin Leon Marshall, Truckee, CA (US); Sean M. McSweeny, Reno, NV (US); Alexander Villacorta, Reno, NV (US)

(73) Assignee: CLEARCAPITAL.COM, INC., Truckee, CA (US)

( * ) Notice: Subject to any disclaimer, the term of this patent is extended or adjusted under 35 U.S.C. 154(b) by 1804 days.

(21) Appl. No.: 12/581,060

(22) Filed: Oct. 16, 2009

Related U.S. Application Data

(60) Provisional application No. 61/106,575, filed on Oct. 18, 2008.

(51) Int. Cl.
    *G06Q 30/02*  (2012.01)

(52) U.S. Cl.
    CPC .............. *G06Q 30/0278* (2013.01)

(58) Field of Classification Search
    USPC ........................................ 705/313
    See application file for complete search history.

(56) References Cited

U.S. PATENT DOCUMENTS

| | | |
|---|---|---|
| 5,414,621 A | 5/1995 | Hough |
| 5,680,305 A | 10/1997 | Apgar |
| 6,058,369 A | 5/2000 | Rothstein |
| 6,115,694 A | 9/2000 | Cheetham et al. |
| 6,178,406 B1 | 1/2001 | Cheetham et al. |
| 6,401,070 B1 | 6/2002 | McManus et al. |

(Continued)

FOREIGN PATENT DOCUMENTS

WO    WO 99/21116    4/1999

OTHER PUBLICATIONS

Clayton, J., Geltner, D., & Hamilton, S. W. (2001). Smoothing in commercial property valuations: Evidence from individual appraisals. Real Estate Economics, 29(3), 337-360. Retrieved from https://search.proquest.com/docview/211150288?accountid=14753 (Year: 2001).*

(Continued)

*Primary Examiner* — Andrew B Whitaker
(74) *Attorney, Agent, or Firm* — Polsinelli LLP

(57) ABSTRACT

The present invention builds Home Data Index (HDI) models. One driving force behind this HDI initiative is that no one model or measure can truly capture the widely dynamic movement of home prices. Even within a small geographical area, such as a ZIP code, there is significant variation in property sale types, sale frequencies and sale values. To better describe these variations, the present invention presents a suite of paired sales and price per square foot index models built around an array of property transaction characteristics. These HDI models expand on the usage and understanding of traditional home price indices (HPIs) by implementing a multidimensional index comprised of four main dimensions: geography; time frames; value range; and property sales type. Several layers exist within each dimension, allowing for more than 300 different index model perspectives for a given property address. For each permutation among the layers of the four main dimensions, a model is constructed with an associated confidence score that reflects the statistical relevance of each estimate.

11 Claims, 5 Drawing Sheets

(56) References Cited

U.S. PATENT DOCUMENTS

| | | |
|---|---|---|
| 6,609,109 B1 | 8/2003 | Bradley et al. |
| 6,609,118 B1 | 8/2003 | Khedkar et al. |
| 6,748,369 B2 | 6/2004 | Khedkar et al. |
| 6,842,738 B1 | 1/2005 | Bradley et al. |
| 6,876,955 B1 | 4/2005 | Fleming et al. |
| 7,289,965 B1 | 10/2007 | Bradley et al. |
| 7,305,328 B1 * | 12/2007 | Fleming ............... G06Q 30/06 702/181 |
| 7,729,965 B1 | 6/2010 | An et al. |
| 7,818,265 B2 | 10/2010 | Loveland |
| 7,822,691 B1 * | 10/2010 | Kuo .................... G06Q 50/16 705/313 |
| 7,835,919 B1 | 11/2010 | Bradley et al. |
| 7,983,925 B1 * | 7/2011 | Kuo .................... G06Q 30/06 705/1.1 |
| 7,987,124 B1 | 7/2011 | Holden et al. |
| 8,046,306 B2 | 10/2011 | Stinson |
| 8,655,106 B2 | 2/2014 | Den Herder et al. |
| 8,832,115 B2 | 9/2014 | Smintina et al. |
| 9,031,881 B2 | 5/2015 | Graboske |
| 2001/0039506 A1 | 11/2001 | Robbins |
| 2002/0087389 A1 | 7/2002 | Sklarz et al. |
| 2004/0010443 A1 * | 1/2004 | May ................ G06Q 10/0635 705/7.28 |
| 2004/0167797 A1 | 8/2004 | Goncalves |
| 2004/0243509 A1 | 12/2004 | Schulkins |
| 2005/0108025 A1 | 5/2005 | Cagan |
| 2005/0154656 A1 | 7/2005 | Kim et al. |
| 2005/0154657 A1 | 7/2005 | Kim et al. |
| 2005/0171822 A1 | 8/2005 | Cagan |
| 2006/0224499 A1 | 10/2006 | Graboske et al. |
| 2007/0033122 A1 | 2/2007 | Cagan |
| 2007/0185906 A1 * | 8/2007 | Humphries ............ G06Q 30/02 |
| 2007/0198278 A1 | 8/2007 | Cheng et al. |
| 2007/0294156 A1 | 12/2007 | Hughes et al. |
| 2008/0004893 A1 | 1/2008 | Graboske |
| 2008/0027806 A1 | 1/2008 | Martine et al. |
| 2008/0082435 A1 * | 4/2008 | O'Brien ............... G06Q 40/00 705/35 |
| 2008/0103963 A1 | 5/2008 | Mahoney et al. |
| 2008/0120363 A1 | 5/2008 | Loveland |
| 2008/0168004 A1 | 7/2008 | Kagarlis et al. |
| 2008/0189198 A1 | 8/2008 | Winans |
| 2008/0201247 A1 | 8/2008 | Bradford |
| 2008/0288312 A1 | 11/2008 | Miles et al. |
| 2008/0301064 A1 | 12/2008 | Burns |
| 2009/0132316 A1 | 5/2009 | Florance et al. |
| 2010/0169301 A1 | 7/2010 | Rubanovich et al. |
| 2011/0258127 A1 | 10/2011 | Graboske et al. |
| 2012/0150753 A1 | 6/2012 | Collins |
| 2012/0158748 A1 | 6/2012 | Smintina et al. |
| 2012/0203771 A1 | 8/2012 | Berry et al. |
| 2012/0278243 A1 | 11/2012 | Frazier et al. |
| 2012/0303536 A1 | 11/2012 | Wierks et al. |
| 2012/0323798 A1 | 12/2012 | Den Herder et al. |
| 2013/0103457 A1 | 4/2013 | Marshall |
| 2013/0103459 A1 | 4/2013 | Marshall |
| 2013/0103597 A1 | 4/2013 | Fout et al. |
| 2013/0117189 A1 | 5/2013 | Mohler et al. |
| 2013/0132287 A1 | 5/2013 | Yao et al. |
| 2013/0144796 A1 | 6/2013 | Fout et al. |
| 2013/0151422 A1 | 6/2013 | Berry et al. |
| 2013/0204674 A1 | 8/2013 | Nathani |
| 2013/0282596 A1 | 10/2013 | Fleming |
| 2013/0290195 A1 | 10/2013 | Frazier et al. |
| 2013/0332374 A1 | 12/2013 | Hartnett et al. |
| 2014/0304145 A1 | 10/2014 | Coon et al. |

OTHER PUBLICATIONS

Bailey, Martin J., Muth, Richard F., Nourse, Hugh O., "A Regression Method for Real Estate Price Index Construction," Journal of the American Statistical Association, Dec. 1963, vol. 58, No. 304, pp. 933-942.
Calhoun, Charles A., "OFHEO House Price Indexes HPI Technical Description," OFHEO Technical Report, Mar. 1996, pp. 1-15.
Case, Karl E., Shiller, Robert J., "Prices of single-family homes since 1970: new indexes for four cities," New England Economic Review, 1987, pp. 1-53.
Wang, Ferdinand T. and Zorn, Peter M., "Estimating house price growth with repeat sales data: What's the aim of the game?," Journal of Housing Economics, 1997, vol. 6, pp. 93-188.
U.S. Appl. No. 13/653,387; Final Office Action dated Mar. 25, 2015.
U.S. Appl. No. 13/653,388; Final Office Action dated Mar. 10, 2015.
U.S. Appl. No. 13/653,388; Office Action dated Jul. 7, 2014.
U.S. Appl. No. 13/653,387; Office Action dated Feb. 25, 2016.
U.S. Appl. No. 13/653,388; Final Office Action dated Mar. 24, 2016.
"Appraisals: Partnerships and valuation tools you can trust," Appraisals by Clear Capital http://clearcapital.com/products/appraisals.cfm (Clear Capital) archived Jan. 2, 2010 from Archive.org.
Wang, Ferdinand T., Zorn, Peter M., "Estimating house price growth with repeat sales data: What's the aim of the game?," Journal of Housing Economics, 1997, vol. 6, pp. 93-188.
U.S. Appl. No. 13/653,387; Office Action dated Jul. 14, 2014.
U.S. Appl. No. 13/653,388; Office Action dated Jul. 14, 2014.
U.S. Appl. No. 13/964,957; Office Action dated Dec. 18, 2013.
U.S. Appl. No. 13/653,387; Final Office Action dated Aug. 19, 2016.
U.S. Appl. No. 13/653,388; Office Action dated Nov. 3, 2016.
U.S. Appl. No. 14/244,809; Office Action dated Nov. 3, 2016.
U.S. Appl. No. 14/244,848; Office Action dated Nov. 17, 2016.
U.S. Appl. No. 13/653,388; Final Office Action dated Jun. 16, 2017.
U.S. Appl. No. 14/244,809; Final Office Action dated Apr. 6, 2017.
U.S. Appl. No. 14/244,837; Final Office Action dated Jul. 6, 2017.
U.S. Appl. No. 14/244,848; Final Office Action dated Jun. 27, 2017.
U.S. Appl. No. 14/244,809; Office Action dated Sep. 11, 2017.
U.S. Appl. No. 14/244,837; Office Action dated Jan. 11, 2017.
U.S. Appl. No. 13/653,388; Office Action dated Jan. 24, 2018.
U.S. Appl. No. 14/244,848; Office Action dated Feb. 23, 2018.
Garritano, "Mortgage Technology's Top 100 Tech Vendors" www.sharperlending.com, Jun. 2, 2005 (Year: 2005).
HUD, 4150.2 Appendix D: Valuation Protocol, Jan. 2006 (Year: 2006).
National Association of Realtors, BPOs: The Agent's Role in the Valuation Process Student Manual, 2011 (Year: 2011).
www.alamode.com, Total User's Guide pdf via Google Search before Apr. 1, 2011 (Year: 2011).
U.S. Appl. No. 14/244,809; Office Action dated Apr. 1, 2019.
U.S. Appl. No. 14/244,837; Final Office Action dated Feb. 1, 2019.
U.S. Appl. No. 14/244,809; Final Office Action dated May 17, 2018.
U.S. Appl. No. 14/244,837; Office Action dated Apr. 24, 2018.
U.S. Appl. No. 13/653,388; Final Office Action dated Oct. 30, 2018.
U.S. Appl. No. 14/244,848; Final Office Action dated Aug. 27, 2018.
U.S. Appl. No. 14/244,809, filed Apr. 3, 2014, Kevin L. Marshall, Comparable Property Identification and Ranking.
U.S. Appl. No. 14/244,837, filed Apr. 3, 2014, Kevin L. Marshall, Peer Based Vendor Selection and Scoring.
U.S. Appl. No. 14/244,848, filed Apr. 3, 2014, Kevin L. Marshall, Report Quality and Valuation Analysis Scoring.
U.S. Appl. No. 14/244,837; Office Action dated Jun. 21, 2019.

* cited by examiner

METHOD AND SYSTEM FOR PROVIDING A HOME DATA INDEX MODEL

CROSS REFERENCE TO RELATED APPLICATIONS

This application claims priority to our provisional patent application titled: "METHOD AND SYSTEM FOR PROVIDING A HOME DATA INDEX MODEL" filed Oct. 18, 2008, with Ser. No. 61/106,575, which is incorporated by reference as if set forth herein.

BACKGROUND OF THE INVENTION

1. Field of the Invention

The present invention generally relates to determining real estate trends and housing values, and, more specifically, to a Method and System for Providing a Home Data Index Model.

2. The Prior Art

The US Office of Federal Housing Enterprise Oversight (OFHEO) publishes the OFHEO HPI, a quarterly broad measure of the movement of single-family house prices. The Housing Price Index (HPI) is a weighted, repeat-sales index, meaning that it measures average price changes in repeat sales or refinancings on the same properties. This information is obtained by reviewing repeat mortgage transactions on single-family properties whose mortgages have been purchased or securitized by Fannie Mae or Freddie Mac since January 1975. The HPI was developed in conjunction with OFHEO's responsibilities as a regulator of Fannie Mae and Freddie Mac. It is used to measure the adequacy of their capital against the value of their assets, which are primarily home mortgages.

The Case-Shiller index prices are measured monthly and track repeat sales of houses using a modified version of the weighted-repeat sales methodology proposed by Karl Case and Robert Shiller. This means that, to a large extent, it is able to adjust for the quality of the homes sold, unlike simple averages.

The IAS360 House Price Index provides a monthly view of housing price trends in the US based on neighborhood level data (market trends at a county level). IAS360 is a comprehensive housing index tracking monthly change in the median sales price of detached single-family residences in more than 15,000 "neighborhoods" across the US. This data is then rolled up to report on the changes in 360 counties, nine census divisions, four regions, and the nation overall. The timeliness of the data, which is based on all arms-length transactions occurring in underlying neighborhoods, makes the IAS360 one of the leading indicators for housing price trends in the US.

Generally, a Home Price Index (HPI) is a measure of how home prices in an area appreciate or depreciate over time based on the sales activity over the same period. One main purpose of HPIs is to offer insight into how market forces affect property values in a particular area. Several statistical approaches are currently used to determine appreciation rates, each with a different way of dealing with time frames, geographic resolutions and sale types. Some published HPIs tend to generate indices at large geographical perspectives, such as state, regional, or metropolitan areas. Additionally, many of the current methodologies also require a substantial time delay between the date of release and the dates for which the estimates are made. In some cases as much as three months pass between the time an estimate is made and the time it is made available. Furthermore, some HPIs only consider a specific class of property sales types, or fail to distinguish among distinct sales types, thereby omitting important sectors of markets that may have significant impact on overall changes.

First introduced in 1963 by Bailey, Muth and Nourse [1] the paired sales (or repeat sales) home price index is based on a linear regression model of relative price changes in repeat transactions of the same property against the time periods from which the sales occurred. The underlying idea is that by only considering repeat sales on the same property, extraneous factors are controlled since changes in value for a particular property, given no structural changes, can be attributed solely to changes in market forces. The linear model then tries to fit the best level of appreciation or depreciation for a given time period by minimizing the error with all observed changes for that time period. Because properties with long time intervals between subsequent sales are more likely to have structural improvements, the basic model was later improved by Case and Shiller [3] in 1987 by introducing an interval weighting procedure that reduces the importance of observations that have longer time intervals between repeat sales. Paired sales index models have received considerable attention as a reliable measure of appreciation and depreciation for real estate markets.

Another method of determining property value is Price Per Square Foot (PPSF). Simply put, the PPSF of a property at the time of a sale transaction is the sale price divided by the area of the interior of the property as measured in square feet. As opposed to the paired sales model which requires at least two sales of the same property without knowledge of property characteristics, the price-per-square-foot (PPSF) approach requires knowledge of the area of the interior of the property but may be obtained from only one sale. This fundamental difference allows the PPSF approach to incorporate a greater set of available data including homes that are selling for the first time. Formally, the PPSF model is typically based upon the median PPSF of all property transactions within a specified time interval.

Recent events, including the crash of the subprime mortgage lending market, the bailout and regulation of Fannie Mae and Freddie Mac, the failure of a number of banks and insurance companies, and the bailout of the banking industry have shown that the current tools available for determining housing values are too inaccurate and often provide stale information. More timely and accurate tools for determining housing valuations would be advantageous.

BRIEF SUMMARY OF THE INVENTION

The present invention builds Home Data Index (HDI) models. One driving force behind this HDI initiative is that no one model or measure can truly capture the widely dynamic movement of home prices. Even within a small geographical area, such as a ZIP code, there is significant variation in property sale types, sale frequencies and sale values. To better describe these variations, the present invention presents a suite of paired sales and price per square foot index models built around an array of property transaction characteristics. These HDI models expand on the usage and understanding of traditional home price indices (HPIs) by implementing a multidimensional index comprised of four main dimensions: geography; time frames; value range; and property sales type. Several layers exist within each dimension, allowing for more than 300 different index model perspectives for a given property address. For each permutation among the layers of the four main dimensions, a model is constructed with an associated confidence score that reflects the statistical relevance of each estimate.

DETAILED DESCRIPTION OF THE INVENTION

Figure 1:
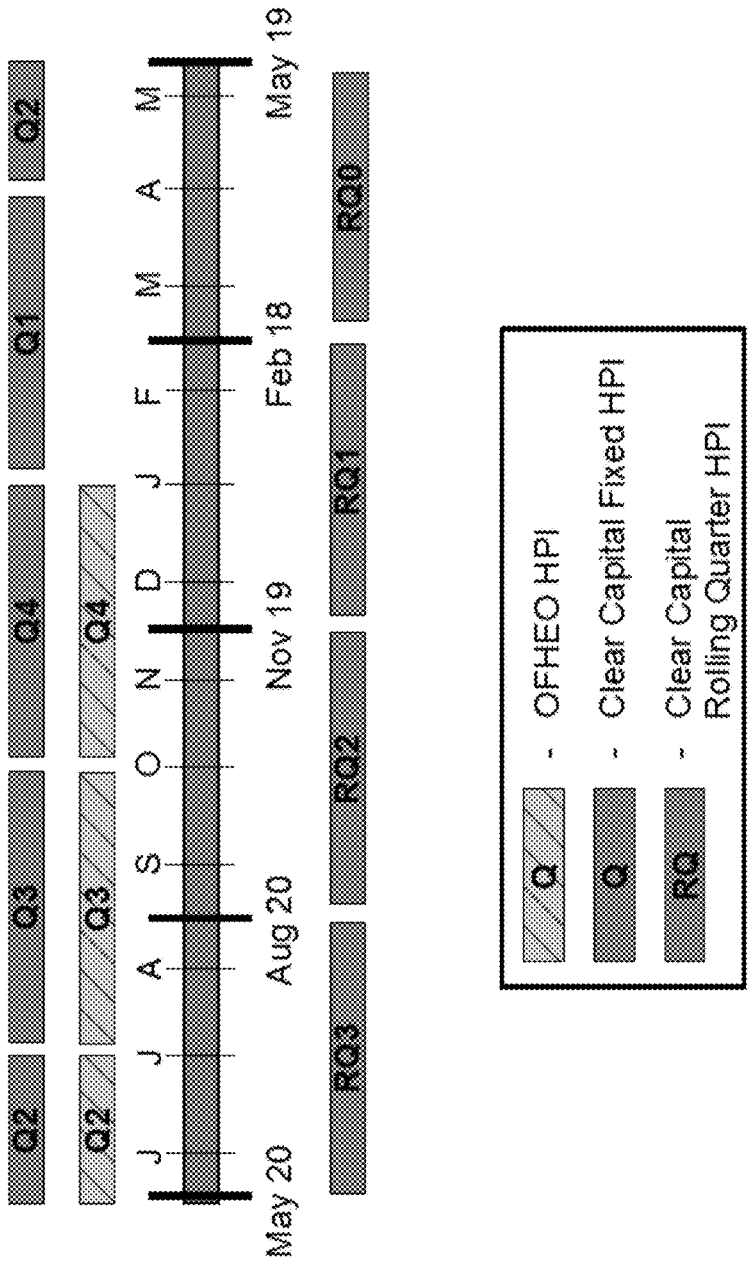
FIG. 1 is a graph showing an example of the rolling and fixed quarter representation vs traditional methods, in accordance with one embodiment of the present invention.

One goal of the Home Data Index (HDI) in the present invention is to provide an accurate view of real estate markets by incorporating various levels of geographic precision, time frames, value intervals, and sale types. Generally, a Home Price Index (HPI) is a measure of how home prices in an area appreciate or depreciate over time based on the sales activity over the same period. One main purpose of HPIs is to offer insight into how market forces affect property values in a particular area. Several statistical approaches are currently used to determine appreciation rates, each with a different way of dealing with times frames, geographic resolutions and sale types. Some published HPIs tend to generate indices at large geographical perspectives, such as state, regional, or metropolitan areas. Additionally, many of the current methodologies also require a substantial time delay between the date of release and the dates for which the estimates are made. In some cases as much as three months pass between the time an estimate is made and the time it is made available. Furthermore, some HPIs only consider a specific class of property sales types, or fail to distinguish among distinct sales types, thereby omitting important sectors of markets that may have significant impact on overall changes. Motivated by these limitations, the approach to real estate market appreciation rates in the present invention includes varying spatial resolutions, data time lag resolutions, sale value stratification, and property sales types. These four main dimensions allow the present invention to provide the clearest picture of market dynamics at the smallest geographical area, using the most recent data available. By allowing users to view market indices this way, a more tailored index may be obtained with greater relevance toward a user's needs. In short, the present invention's HDI allows one to view real estate markets through an array of prisms to better suit the various characteristics of markets across the country.

To begin, it makes sense to reiterate the definition of a home price index. A HPI is typically considered a measure of the movement of home prices in an area, giving numeric valued estimates as to how much a particular area is appreciating or depreciating. The present invention uses two approaches to measuring real estate market changes. The first is based on paired sales of distinct properties and the second is based on the movement of price per square foot trends.

First introduced in 1963 by Bailey, Muth and Nourse [1] the paired sales (or repeat sales) home price index is based on a linear regression model of relative price changes in repeat transactions of the same property against the time periods from which the sales occurred. The underlying idea is that by only considering repeat sales on the same property, extraneous factors are controlled since changes in value for a particular property, given no structural changes, can be attributed solely to changes in market forces. The linear model then tries to fit the best level of appreciation or depreciation for a given time period by minimizing the error with all observed changes for that time period. Because properties with long time intervals between subsequent sales are more likely to have structural improvements, the basic model was later improved by Case and Shiller [3] in 1987 by introducing an interval weighting procedure that reduces the importance of observations that have longer time intervals between repeat sales. Paired sales index models have received considerable attention as a reliable measure of appreciation and depreciation for real estate markets.

The mechanics behind the paired sales model in the present invention follow close to the three stage weighted repeat sales model. The main mathematical principle behind the model is that house prices are determined by a market index plus some random volatility that follows a log-normal diffusion process. The errors for this model are further assumed heteroskedastic, or put another way, the errors are assumed to be correlated to the time between subsequent sales. In a first stage of construction, market changes are estimated under the assumption that errors associated with the differences in repeat sales ratios are independent of time between sales. In a second step, this assumption is relaxed and the relationship between the time intervals and the stage-one errors are found. In a final step, the paired sales are re-weighted to reflect the extra degree of uncertainty to those sales with longer time intervals between sales. The estimates in this last step are reported as the final index values. For the first stage, the price, $\pi_{i,t}$, of home i sold at time t has the following relationship:

$$\log(\pi_{i,t}) = \log(I_t) + H_{i,t} + N_{i,t} \quad (1)$$

where $I_t$ is the market index value for that area, $H_{i,t}$ is a Gaussian random walk process representing the volatility over time, and Ni, t is white noise error associated per time per property and is uncorrelated over time and with other properties. Thus, taking logs of relative price changes for the same property I sold at time $t_1$ and $t_2$, we get:

$$\log\left(\frac{\pi_{i,t_2}}{\pi_{i,t_1}}\right) = -\log(I_{t_1}) + \log(I_{t_2}) + \varepsilon_{i,t_1,t_2} \quad (2)$$

where $\varepsilon_{i,t_1,t_2}$ is a generalized error term consisting of the differences in the Gaussian diffusion processes and the differences in the uncorrelated white noise terms. To better account for data which contains erroneous sale values or situations where there are unusual price changes, a relative price change limit is also imposed by the present invention. Paired sale pairs are removed from model construction if the average appreciation or depreciation per quarter is more than some prespecified or configured limit. In one embodiment of the present invention, this limit is 33 percent. Equation 2 (above) demonstrates how log price ratios on the same distinct property can be viewed as differences in the logged index values at the two time periods where the sales occurred plus some random variation. After controlling for outlying relative price changes, this framework allows for direct application to ordinary least squares regression. To see this, first define the (n×t) dummy variable matrix D to be:

$$D_{i,t} = \begin{cases} -1 & \text{If property } i\text{'s first sale is in time period } t \\ 1 & \text{If property } i\text{'s second sale is in time period } t \\ 0 & \text{Otherwise} \end{cases} \quad (3)$$

Also, define Y to be a (n×1) vector of logged price relatives, where n is the number of total paired sale transactions for a given area. Similarly, define a to be a (n×1) vector of error terms following a Gaussian distribution and β to be a (t×1) vector of unknown logged index values, where t is the total number of time periods. Then the vector representation of equation 2 can then be rewritten as $$Y = D\beta + \varepsilon \quad (4)$$

where the vector of unknown logged index values, β, is calculated as the solution to least squares regression. As noted in [2], to avoid perfect collinearity a base period should preferably be set where the index value is restricted to a certain value. For the HDI rolling quarter setup in the present invention shown in the example in FIG. 1, the base quarter is typically assigned to be the seventh quarter prior to the current quarter and for the fixed quarter setup the base quarter is assigned to be quarter 2 of the year 2006. As noted above, the errors associated with a first stage estimation have been shown [3] to be heteroskedastic with respect to time. To account for this, the second stage procedure in the present invention aims to find how the errors are related to the time between sales. Because of the assumptions of the initial model, the errors from the first stage have the following relationship:

$$\varepsilon_i^2 = A(t_2 - t_1) + B(t_2 - t_1)^2 + 2C + \varphi_i \quad (5)$$

where $\varphi_i$ is another idiosyncratic error term. Ordinary least squares regression is again typically used to estimate the parameters A, B, and C. The estimated parameters in this second stage represent the level of dispersion for sales around the market index as a function of time. The fitted error estimates, $\hat{\varepsilon}_i^2$, from the second stage are then used as inputs into the final third stage of weighted least squares regression. The third stage estimation involves weighting each paired sale by its time between subsequent sales. Using the fitted error estimates from the second stage estimation, the final index values are derived from the following equation:

$$\log\left(\frac{\pi_{i,t_2}}{\pi_{i,t_1}}\right) / \sqrt{\hat{\varepsilon}_i^2} = -\log(I_{t_1}) / \sqrt{\hat{\varepsilon}_i^2} + \log(I_{t_2}) / \sqrt{\hat{\varepsilon}_i^2} + \varepsilon_{i,t_1,t_2} / \sqrt{\hat{\varepsilon}_i^2} \quad (6)$$

Since the weighted regression is typically performed on the logged indices values in the present invention, the index values are found by component-wise exponentiating the estimated parameter vector found in the third stage. Finally, because of the initial assumptions of log normality of the first stage model, the standard error for an index value $I_t$ at time period t is:

$$\sigma_{I_t} = I_t \sigma_{\hat{\beta}_t} \quad (7)$$

where $\hat{\beta}_t$ is the standard error observed in the third stage estimation.

Two main driving forces can introduce significant volatility into the paired sales model: property up-grades/damages and limited sample sizes. Both sources of volatility can affect the estimation of market appreciation in either an upward or downward bias of appreciation. The present invention's HDI solution provides controls for both sources to better capture true market changes. By design, the paired sales model attempts to control for differences in property characteristics and other extraneous variables by only calculating appreciation from those properties where two or more sales exist. The paired sales design historically depends on the assumption that no structural changes have occurred with the property, thus attributing price differences solely to market forces. However, as many home owners know, structural improvements are a natural occurrence during the lifetime of a home. In particular, structural improvements made immediately after a purchase of a home with the intent of improving condition for an immediate re-sell, otherwise known as a "flip", can cause the observed appreciation for the observed time interval to be bias upward. The possibility also exists for over-estimating market appreciation where no immediate resale occurs after improvements. The same idea holds true for properties that experienced substantial damages not associated with typical wear and tear of use, such as in cases of damages attributed to fires, hurricanes, and other natural disasters. In these cases the reverse effect is observed: the estimation of market dynamics is biases downward.

Small sample size or biased sample selection is another source of variance in the construction of the typical paired sales model. Nearly all statistical models rely on the assumption that the data being analyzed are a representative sample of the population. When data sample sizes are small or are biased in the way they sample the population, there is a risk that the data does not accurately capture the full feature set of the population. In the case of real estate transactions, biased samples may occur when there is a systematic omission of transaction records for a particular county. Such is the case when real estate owned (REO) property sales are not processed in public records. Similarly, increased volatility occurs in the paired sales model for non-disclosure areas, new developments (first ever sale transactions), or where little to no sale transactions take place.

The implementation of the paired sales model in the present invention aims to control for these extra layers of volatility by placing restrictions on the set of available paired sales and by conditioning the input data to better isolate systematic bias. In efforts to exclude property flips or potential fraudulent transactions, any subsequent sales on the same property must have occurred at least a prespecified (90 in one embodiment of the present invention) days apart from one another. This filter helps to control for property flipping and also for errors in data entry that record two subsequent sales within a matter of days. In addition to placing a time requirement between subsequent sales, as mentioned elsewhere herein, candidate paired sales must not have appreciated or depreciated on average more than a prespecified amount (33 percent in one embodiment of the present invention) per quarter. Additionally, paired sales that have a long time interval between subsequent sales are preferably down-weighted to reflect an increased chance that a property has had structural upgrades. As will be described below, the present invention preferably segments input data along four main dimensions allowing distinct paired sales models to be built per individual market segment. The net result of building a suite of models based on the principal dimensions is that any sampling bias is more easily identified. Because the data are segmented, for example by sale price, any systematic bias within sale price is captured and consequently a model may be built solely for that class of property, thus turning any bias into a more specified model class.

In addition to the weighted paired sales approach, the present invention also preferably uses price per square foot (PPSF) trends to better understand market dynamics. Simply put, the PPSF of a property at the time of a sale transaction is the sale price divided by the area of the interior of the property as measured in square feet. As opposed to the paired sales model which requires at least two sales of the same property without knowledge of property characteristics, the price-per-square-foot (PPSF) approach requires knowledge of the area of the interior of the property but may be obtained from only one sale. This fundamental difference allows the PPSF approach to incorporate a greater set of available data including homes that are selling for the first time. Formally, the PPSF model is typically based upon the median PPSF of all property transactions within a specified time interval. That is, the PPSF of home i at time t is given by:

$$PPSF_{i,t} = \frac{\pi_{i,t}}{BS_i} \quad (8)$$

where $BS_i$ is the building size of the property. The PPSF trends are then typically obtained by aggregating all PPSF values over a specified time range, typically 91 days, and taking the median value of that set. The series of median PPSF values over subsequent time intervals define the PPSF index.

Analogous to the paired sales model construction, the PPSF index values are associated with a measure of volatility and the PPSF Index in the present invention uses the median absolute deviation (MAD). The MAD value for a set of numbers describes how much deviation, or spread, there is from the median value. In the case of the median PPSF, the MAD measures the dollar amount that half of the PPSF values fall from the median PPSF. For a set of sale transactions of size N suppose that $PPSF_{i,t}$ represents the PPSF of property i during a specific time interval t, then the MAD value for the set of N PPSF values is given by:

$$MAD_t = \text{median}(|PPSF_{1,t} - PPSF_{med,t}|...|PPSF_{N,t} - PPSF_{med,t}|) \quad (9)$$

where $PPSF_{med,t}$ is the median PPSF during a specific time interval t.

One main source of volatility for the PPSF index typically is that the median value at each consecutive time interval is taken for a set of sales that are not assured to be similar in terms of property characteristics. For example, in one quarter, there may be a wave of sales of low priced homes as investors look to buy good bargains, but in the following quarter, high priced homes may be selling as people look to upgrade their dwellings. The net effect of this scenario is that the PPSF index would show a large bias toward the change in properties being sold as opposed to capturing the true appreciation rate, which may or may not be increasing. For areas where the quarter-by-quarter sample of sales transactions are approximately similar in terms of types of homes being sold, the PPSF index will often do well to show changes. However, changes in the PPSF index may be attributed to changes in buyers' preferences rather than changes in market forces when consecutive samples are not similar. In general, this effect is most visible for large geographical areas, such as at a state level, which encompass many possible housing types and thus PPSF values leading to significant volatility in the median PPSF trend. Another source of variation arises from the different reporting standards of property size. Reporting standards of property size may vary from county to county and some may even omit usable living space such as finished basements. These differences in reporting standards may increase volatility in the PPSF trend since omitting a certain portion of usable living space will artificially increase the PPSF value. Interestingly, if a certain area consistently reports the total living area, even if the value is not accurate, the PPSF trend will still reflect changes in buying patterns on a proportional level. That is, even though the actual PPSF values are biased, the relative change of the index over subsequent quarters will often still reflect true buying patterns.

The unique Home Data Index (HDI) solution in the present invention builds upon repeat sales and price-per-square foot methodology by segmenting a collection of national property transactions into four major dimensions: time, geography, value range, and sales type. Other segmentations are also within the scope of the present invention. Each of these four dimensions allows users to control for greater clarity and resolution in the vast array of dynamic real estate markets found in the United States.

One recurring complaint about current home price indices (HPI) methodologies is the frequency and time lag for which HPI estimates are released. For instance, the Office of Federal Housing Enterprise Oversight (OFHEO) releases a very popular HPI four times a year, with each release giving estimates for the quarter two months prior to the release date. In other words, at the time that the OFHEO HPI is released, the HPI estimates are for a time period approximately two months in the past. In times of volatile real estate markets, such infrequency and lag-time for estimates is unacceptable. The HDI in the present invention aims to overcome these time delays by incorporating rolling quarter in addition to fixed quarter time frames.

FIG. 1 is a graph showing an example of the rolling and fixed quarter representation vs traditional methods, in accordance with one embodiment of the present invention. Rolling quarter time frames provide the most flexibility in terms of using the maximum amount of data to provide the most current estimate possible. Unlike traditional calendar year quarters, which have specific starting dates (January 1, April 1, etc.) and have either 90, 91 or 92 days in each, rolling quarters have no specified start dates and only the duration for which they run is (typically, but not necessarily) fixed, namely 91 days in the case of rolling quarters. In efforts to maximize the availability of incoming data, the most recent rolling quarter is defined to be the most recent 121 days with subsequent rolling quarters consisting of 91 day segments. Because rolling quarter time frames have no fixed start date, they can be used to generate indices at any arbitrary time period. The ability to start a quarter at any arbitrary time is one thing that gives the rolling quarter the most flexibility. For example, suppose someone is interested in the market changes in a certain area for the week of May 19. With traditional fixed quarters, one would have to potentially wait until early September to get estimates about the second calendar quarter, and would only have quarter 4 of the previous year estimates available on May 19. Using the approach in the present invention, the most recent quarter would be fixed so that the quarter ended on May 19 allowing for the most current data to be input into model construction. The HDI would be built from the new quarter configuration and an estimate for market changes pertaining to the quarter ending May 19 could be calculated. This example illustrates that the rolling quarter method gives the present invention a way to produce up-to-date market indices as new data flows in, giving users the most current market measures available.

Note that in one embodiment of the present invention, rolling quarters are implemented. However, the present invention is not limited to rolling quarters. Rather, one embodiment of the present invention allows users to specify the length of periods. Thus, users can chose rolling months, or rolling thirds, or, indeed, any other period of time that the might have an interest in. Also, the periods do not have to have the same length or number of days. Thus, in the example of rolling quarters disclosed above, the current quarter is considered to be 121 days long, whereas previous quarters are each 91 days long. This is because it was found that lengthening the latest period increased the accuracy of the model, due to, for example, incomplete reporting during that period. Also, as disclosed above, the present invention also supports fixed periods of arbitrary prespecified length, such as the fixed HPI shown in FIG. 1.

The present invention also offers a traditional fixed quarter approach to HDI construction to maintain a reference to other HPI reporting agencies, and a resource for users with fixed-calendar-quarter time frame needs. Similar to the reporting practices of other agencies, fixed quarters in the present invention represent time intervals as commonly accepted calendar quarters, with the four quarters starting on January 1, April 1, July 1, and October 1. However, as opposed to existing fixed quarter HPIs, the present invention offers current measures. For the first 45 days of each traditional quarter, the present invention reports the previous quarter's HDI value. After 45 days, the present invention begins to report HDI estimates for the present quarter. In other words, the maximum delay under the fixed quarter setup is 45 days with a minimum delay of only a few days. In the example above, prior to May 15, the present invention would report HPI estimates for the first quarter of 2008, and on May 19 estimates for the second quarter would be released. FIG. 1 shows the differences between the two ways in which time frames are considered and how the present invention's approach provides estimates with the most current data available. It is important to note in the examples above that since on May 19 the second quarter is still ongoing, precise estimates are difficult to construct. However, there are situations where volatile, yet timely, estimates provide valuable insight to rapidly evolving markets. Estimates for quarters that are still ongoing provide a first look that is likely to evolve as the quarter progresses. Of course, knowing the degree of uncertainty, or standard error of the estimates, can be important and accordingly is typically reported in the present invention to help users to determine how stable first-look estimates are for a particular area. Since the present invention frequently updates its HPI models as new data arrives, users can update their views and track changes in real estate markets as they develop. Considering these limitations, it is again worth noting that the present invention's primary rolling quarter model avoids most of this volatility by simply reconfiguring the boundaries that define quarter intervals.

One of higher priorities in the present invention with regards to home price index construction is the availability of fine geographical resolution. There is typically no argument that real estate markets vary greatly by area. Even with identical property characteristics, homes near waterfronts certainly have different dynamics than homes in the desert. In many, if not most cases, real estate markets vary considerably within metropolitan statistical areas and even within neighborhoods. Motivated by this, the present invention attempts to provide as much geographical precision and options as possible, with market estimates constructed for areas as small as census block groups (typically 300-500 housing units) and as large as states. Clearly, not all areas of the country will have sufficient sales transaction data to provide estimates at the smallest geographical resolutions, but in areas with high data density the ability to drill down to such small geographical areas provides significant benefit. The HDI in the present invention evaluates market trends at a spectrum of eight points up to the state level, including:

Census Block Groups
Census Tracts
ZIP Codes
Census Counties
Core Based Statistical Areas (CB MSA)
Metropolitan Divisions (MD MSA)
Combined Statistical Areas (CS MSA)
States Note that these eight points or levels are implemented in one embodiment of the present invention. Other points or levels may be implemented in other embodiments. For example, Census Blocks may be added, or several of the MSAs may be combined.

Figure 2A:
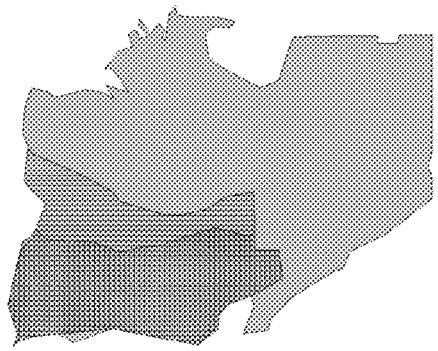
FIG. 2 is a diagram that shows the range of spatial precision used in the present invention's HDI.
Figure 2B:
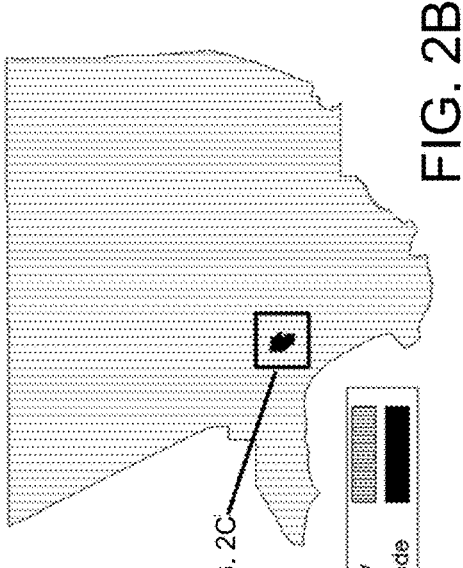
Figure 2C:
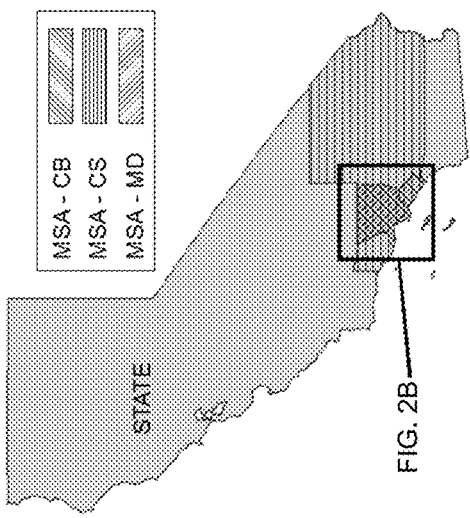

FIG. 2 is a diagram that shows the range of spatial precision used in the present invention's HDI. FIG. 2A shows State and MSA Levels, 2B shows County and ZIP Code Levels, and 2C shows ZIP, Tracts, and Block Groups. Similar to the case of increased volatility for up-to-the-minute estimates, models built at small geographic areas will also tend to have estimates with increased variability. The present invention provides these rough estimates in order to allow users to get an up close view of the local markets. For housing areas where data density is high, the present invention's HDI allows one to drill down to the smallest available area of interest with increased confidence. Additionally, for users who prefer estimates based upon a specific spatial resolution regardless of standard error of the estimate, or degree of uncertainty, the present invention's HDI allows users to exclusively investigate a specific spatial level where data sufficiently exists.

The geo-referencing system in the present invention generalizes beyond HPI construction. Every sale transaction that enters assignee's proprietary database is geocoded to find its location in each of the eight spatial resolutions outlined above. Having this system in place allows for additional measures to be estimated at the eight geographic levels including median sale prices, price per square foot, and average property type to name a few.

To better understand the dynamics of market trends among different property value ranges, property sale transactions are further decomposed by nominal sale value. The underlying idea is that higher priced homes tend to follow different market dynamics than lower priced homes. To allow users to explore these differences, one embodiment of the present invention provides a four-tiered pricing classification for each sale transaction. For every geographical area larger than Tract and distinct time unit (fixed or rolling quarter), the total set of property sale transactions are ordered by sale price and the $25^{th}$ percentile and $75^{th}$ percentile cutoffs are determined. The following set of cutoffs is used in that embodiment to determine the collection of data to process:

Low Tier (L): Sales prices that are below the $25^{th}$ percentile for given time and location Mid Tier (M): Sales prices that are above between the $25^{th}$ percentile and $75^{th}$ percentile for given time and location Top Tier (T): Sales prices that are above the $75^{th}$ percentile for given time and location All Tier (A): All sale transactions for a given time and location In the case of the Block Group and Tract geographies, sale value tiers are typically determined from County aggregate data. One main reason for using County level sale value tiers is to control for biased tier cutoffs based on small sample sizes typically found at the Block Group and Tract geographies. Other tiers and cutoffs are also within the scope of the present invention. Also note that these values may be dynamically determined or modified in some embodiments of the present invention.

The fourth major dimension for which this embodiment of the present invention's HDI is built from is the property sales type. It is well known that not all property sale transactions are the same. In fact, there can be dozens of classes of sale types, each with a different classification as to the type of buyer, seller, and condition of sale. With so many delineations of property sales, it is imperative to clearly separate sales that do not share fundamental characteristics. This embodiment's HDI, like the time, spatial, and value range dimensions discussed above, incorporates a sales type dimension which helps to clarify whether sale transactions are fair market arm's length transactions, distressed sales, conforming, or any combination of the three. By carefully mining databases in addition to custom filtering tools, the transaction data supporting the HDI can be identified as a Real Estate Owned (REO) sale, foreclosure, or fair market arms length sale. Also, since the Government Sponsored Enterprises (GSEs) publicly post their requirements for conforming loan limits, conforming level tiers may be generated to assist users who work exclusively with conforming loans who also want the flexibility of the present invention's approach to time, space, and value resolution. For example, one may wish to investigate only arms length transactions or a mix of both fair market and distressed sales for areas where there is a significant proportion of both types of sales. A list of some insightful classifications are found below:

Performing—Fair market, arms length, non-REOs
REO Blended—Mix of performing and distressed Point estimates of market changes are often useful for many applications, but it would not be difficult to think of a situation where one would be less interested in a point estimate and more interested in an interval range. For others, an indication of market direction may be sufficient for applications. In efforts to provide solutions for each of these situations, embodiments of the present invention provide point, bin and direction HDI output. Given the point estimate and associated standard errors as described in the preceding sections, bin and direction estimates provide a generalized interval of values that allow users to see how likely the estimates are to fall into a particular range. In the case of the direction output, a direction of increasing or decreasing is returned with an associated value of how likely is the returned direction.

Similarly, the bin output is defined in one embodiment to be the interval width of two percent centered around the point estimate, given with a probability of how likely the estimate is to fall in that range. Formally, the probability of the true (unknown) market index point being in the specified bin is equal to the probability that the point is contained within the bin interval under the assumption that the true market index point is a normally distributed random variable with mean equal to the point estimate and standard deviation equal to the index value standard error.

Figure 3A:
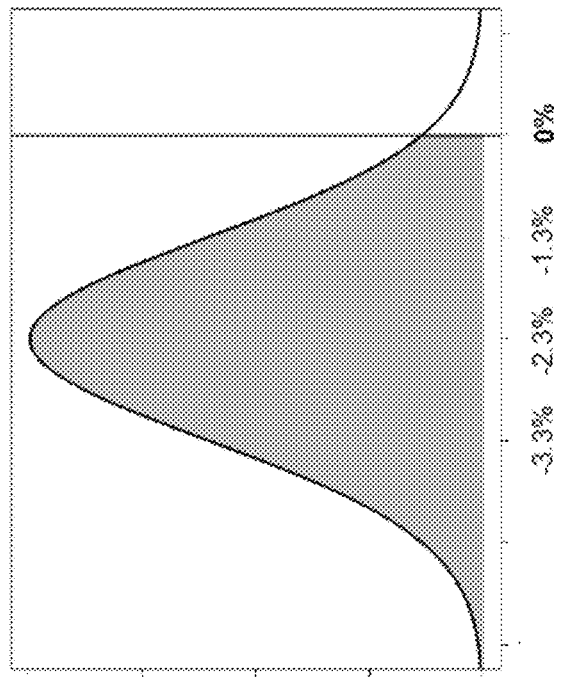
FIG. 3 is a set of graphs illustrating exemplary representations of bin and direction outputs, in accordance with one embodiment of the present invention.
Figure 3B:
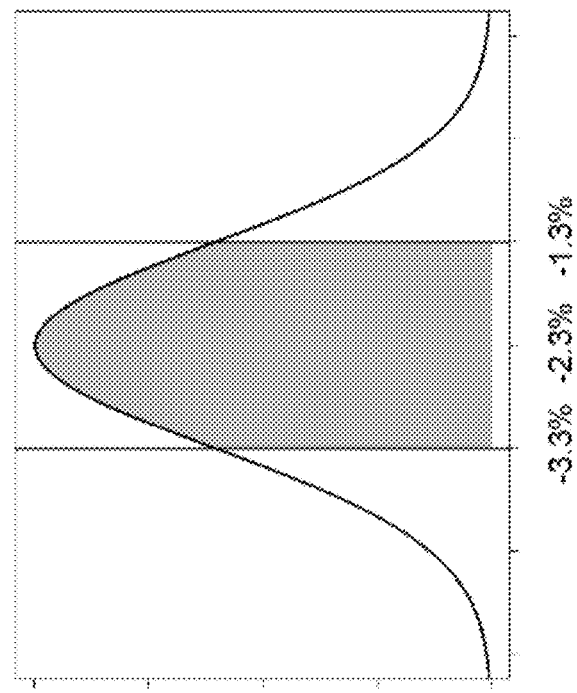

FIG. 3 is a set of graphs illustrating exemplary representations of bin and direction outputs, in accordance with one embodiment of the present invention. FIG. 2a shows Bin likelihood, and FIG. 2b shows Direction likelihood, in this example. To better understand how the bin and direction output generalize the point estimate, suppose the estimated measure of market change for a given area, for the current time period, is −2.3% with a standard error value of 1.4%. Under these values, the bin output would be:

$$\text{BIN}: (-3.3\%, -1.3\%), P(\text{BIN}) = \Phi\left(\frac{-1.3 - (-2.3)}{1.4}\right) - \Phi\left(\frac{-3.3 - (-2.3)}{1.4}\right)$$

Or if the estimated measure of market change for a given area is C, standard error value is E, and the BIN width is $\Delta$, then:

$$\text{BIN}: (C - \Delta, C + \Delta), P(\text{BIN}) = \Phi\left(\frac{\Delta}{E}\right) - \Phi\left(\frac{-\Delta}{E}\right)$$

The direction output is calculated in an analogous manner, but only considers two possible bins: $(-\infty, 0]$ and $(0, \infty)$. In the example given above the direction output would be:

$$\text{Direction}: (-\infty, 0], P(\text{Direction}) = \Phi\left(\frac{0 - (-2.3)}{1.4}\right) \text{ or}$$

$$\text{Direction}: (-\infty, 0], P(\text{Direction}) = \Phi\left(\frac{0 - C}{E}\right) = \Phi\left(\frac{-C}{E}\right)$$

Exemplary graphical representations of the likelihood that the market changes fall within each bin or direction are given in FIG. 3.

In today's volatile real estate markets, it is of utmost importance to have reliable and accurate measure into the status and momentum of price changes. The approach of the present invention to HPI construction takes into consideration some of the most important elements facing real world users of home appreciation indices and presents them in a form that is easy to understand and use. This HDI solution takes a four (or more) dimensional view of property sale transactions to deliver near real-time market valuations for an array of property type sales as well as at various spatial resolutions. In addition to this four dimensional approach, this HDI invention also offers three output types for users who either want a specific, an interval, or a directional view of market performance.

The innovative multidimensional approach of the present invention to home price index (HPI) construction opens the door for more detailed and sale type specific analysis for thousands of geographic areas around the country. For a single location in the country, models from one embodiment can provide over 300 different index perspectives reflecting the two model types (PPSF, PS), eight geographic levels, two time interval structures, four price tier segmentations, and three sales type classifications. This expansive coverage is a real world approach to the seemingly endless combination of ways real estate transactions occur. In addition to providing a collection of home price indices that model the intricacies of localized markets, the present invention also provides automated selection criteria via an algorithmic approach. With this added feature, an optimal set of HDIs for a given portfolio may be selected based on a maximum threshold of volatility. The suite of models delivered by the present invention allows the user to make important financial decisions based on a spectrum of estimates that range in volatility or risk. Because of the inflow of new property sale transaction data and data mining of assignee's proprietary database, the entire collection of HDI models are continually being updated, allowing users to track changes in real estate markets as they happen. It is the comprehensive view of time, space, and sale type that ultimately separate the present invention's home data indices (HDIs) from the rest of the field.

A Geographic cascade is utilized in the present invention for the purpose of selecting the most appropriate set of data, indicator or model, starting or ending at a geocode (i.e. Latitude & Longitude) and stepping through various markets and or segments based on adjustable data quality measures such as standard deviation, median absolute error, number of observations or other measure of data quality.

HDI calculation in one embodiment of the present invention features an address level cascade that provides the smallest geographically relevant data, indicator or model possible. This is typically accomplished using a spatially-enabled/GIS database of properties (i.e. latitudes & longitudes) and markets (i.e. areas and/or data segments) which allow one to step through various spatially determined hierarchies of markets until the smallest geographic area providing sufficient data is identified. The present invention looks at the geographic point that a property exists and makes determinations from there. Within geographic zones, the cascade may further check through set characteristics (e.g. price tiers) at different levels of granularity before moving on to larger geographic zones to find sufficient data.

Figure 4:
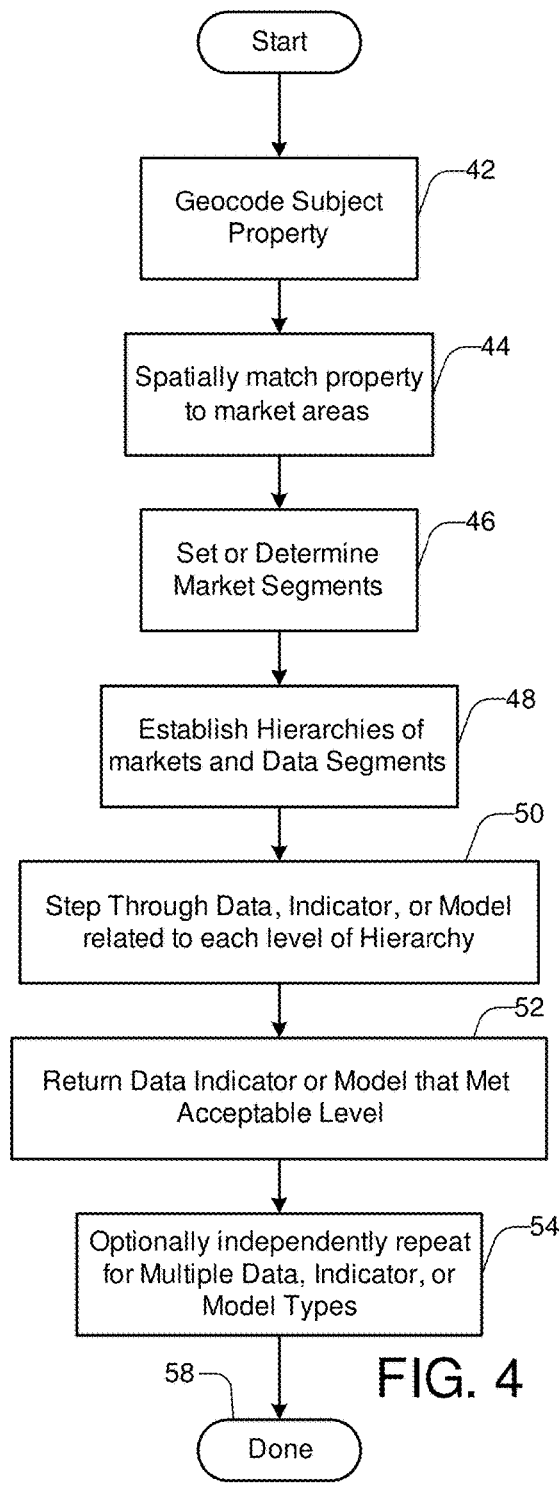
FIG. 4 is a flowchart illustrating geocode cascading, in accordance with one embodiment of the present invention.

FIG. 4 is a flowchart illustrating geocode cascading, in accordance with one embodiment of the present invention. The general process for geocode cascading comprises:

Geo-Code subject property, step 42
Determine markets related to the subject by spatially comparing the subject's geo-code to a pre-set or on-the-fly computed market area(s), step 44.
   Market areas may be set based on an adjustable measure of quality or acceptability
Set or determine market segment of the subject, step 46.
Establish hierarchies of markets and data segments, step 48.
Step through data, indicator or model related to each level of the hierarchy until an adjustable measure of quality or acceptability is met, step 50.
Return data, indicator or model that met acceptable level, step 52.
Optionally and independently repeat for multiple data, indicator or model types to return multiple model perspectives, step 54.

The geo level cascade methodology is a set of instructions that determine which Home Price Index model is returned within the Home Data Index infrastructure. The geo level cascade defines the logic that is used to choose from over 300 Index models per address in one embodiment of the present invention. At a high level, the geographic cascade aims to choose from the best available Index model at the smallest geographic resolution. In this context, geographic resolution may be any arbitrary set of overlapping geographic boundaries that may be ordered to reflect a certain hierarchical structure. For instance, geographic boundaries may include census boundaries such as blocks and tracts or political boundaries such as congressional or school districts. Once an ordering is obtained for the set of geographical boundaries, a selection criteria is derived to choose among potential competing models at the same geographic level. For example, there may be distinct models built that consider subsets of a population all at the same geographic level. To choose between competing models the selection criteria measures characteristics from each of the models to determine which returns a more reliable estimate of the value under consideration.

Geocoding is the process of finding associated geographic coordinates (often expressed as latitude and longitude) from other geographic data, such as street addresses, or zip codes (postal codes). With geographic coordinates the features can be mapped and entered into Geographic Information Systems (GIS), or the coordinates can be embedded into media such as digital photographs via geotagging. Geocoding property addresses or locations are within the scope of expertise of those reasonably skilled in the relevant art. Indeed, online mapping services, such as Google Maps, implicitly geocode street addresses before displaying maps containing the street addresses. In the present invention, properties are geocoded using standard methodologies that have not already been geocoded, in one embodiment expressed as latitude and longitude. Also, when membership of properties in groups at specific geographic levels is not already determined, those geographic groupings have their boundaries geocoded, and the geocodes of subject properties compared to those boundaries to determine membership thereof. Thus, it may not be necessary to geocode the boundaries of states, since the state that a property resides in is typically well known, but it may be necessary to geocode the boundaries for Census block groups.

Figure 5:
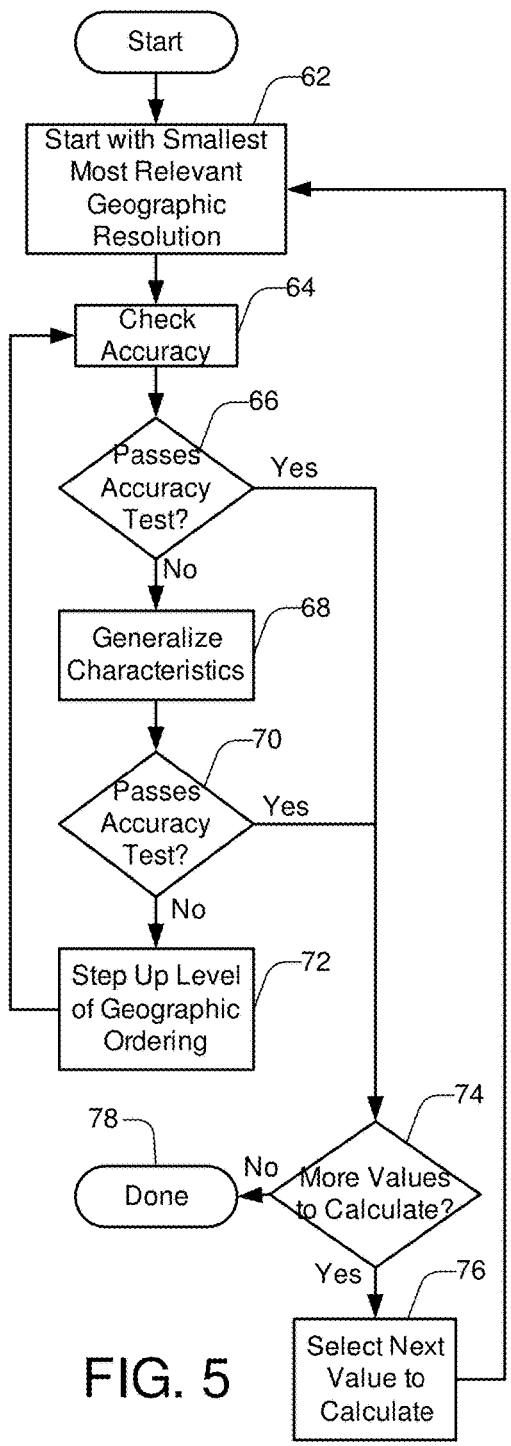
FIG. 5 is a flowchart illustrating geocode cascading for calculating a Home Data Index, in accordance with one embodiment of the present invention.

FIG. 5 is a flowchart illustrating geocode cascading for calculating a Home Data Index, in accordance with one embodiment of the present invention. In particular, for the current Clear Capital Home Data Index, the geo cascade follows the following paradigm:

Start with the smallest most relevant geographic resolution, step 62. For the HDI this is typically the Census block group geographic boundary. For a given statistical model, data set, or other quantitative measure, under the requirements that best match desired value at the current geographical area, check its accuracy, step 64. If model passes accuracy test, step 66, stop this iteration, if not continue. For the case of the HDI, the statistical model is the Home Price Index and the requirements are matched value (price tier) at the current geo level. Accuracy is measured in terms of statistical volatility to inputted threshold level.

If measured accuracy does not meet threshold criteria, step 66, check accuracy of model that generalizes characteristics, but not geographic resolution, step 68. If the model passes the accuracy test, step 70, stop this iteration, if not continue. In one embodiment, the subject price bracket is generalized to tier the 'All' tier, and model's volatility is checked against a threshold.

If measured accuracy still does not meet threshold criteria, step 70, step up a level in the geographic ordering (going from smallest to largest), step 72, and require original most relevant set of requirements at the new geographic level and return to recheck accuracy, step 64.

A check is made whether or not there are more values to calculate, step 74. If there are more values to calculate, step 74, the next one is selected, step 76, and the process is repeated, starting with the smallest, most relevant geographic resolution, step 62. Otherwise, the process is complete, step 78. This later set of steps is simplified for clarity here. In one embodiment of the present invention, housing value estimates in different cells in a spreadsheet of properties are calculated. For example, each row may be a separate property, with multiple columns corresponding to different HPI metrics or models. Thus, for example, there may be columns for paired sales, price per square foot (PPSF), point, bin, and direction. Market direction may be statistically valid at the block group level, whereas the bin may only be accurate at the zip code level. The present invention typically determines the lowest geographic level model that provides a statistically valid result. Also note that before trying higher geographic level values for statistical accuracy, other categories at that geographic level are generalized first, searching for a statistically valid value. Thus, while a property may be in the top tier in price, a value in one cell may not be valid in that tier, but may be for the "all" tier grouping, and that value is used in preference to moving up to a higher geographic level. The result is that the lowest level, most selective, statistically valid value is calculated for each different property and metric.

The previous paragraphs describe a general cascading methodology in accordance with a preferred embodiment that operates by choosing the most granular model for a given address. The basic approach there is to first do a horizontal search among possible models at the same geographic level before stepping up vertically to the next most granular geographic level. This approach also may be generalized to allow user preferences to dictate the order in which cascading prioritization is given. In particular, users may choose to place most importance on a specific segment of a model, such as price tier, and as a result, search in a vertical manner along that component. In other words, if a preference is given, such as price tier level, then the cascading methodology can iteratively search among different geographic levels only, thereby omitting the horizontal search within a geographic level. Alternatively, the same preference may be given to a geographical component. If a user wishes to only search for valid models within a specific geographic level, the cascading methodology could omit the vertical search and focus only on the horizontal search. These and other alternatives are all within the scope of the present invention.

Figure 6:
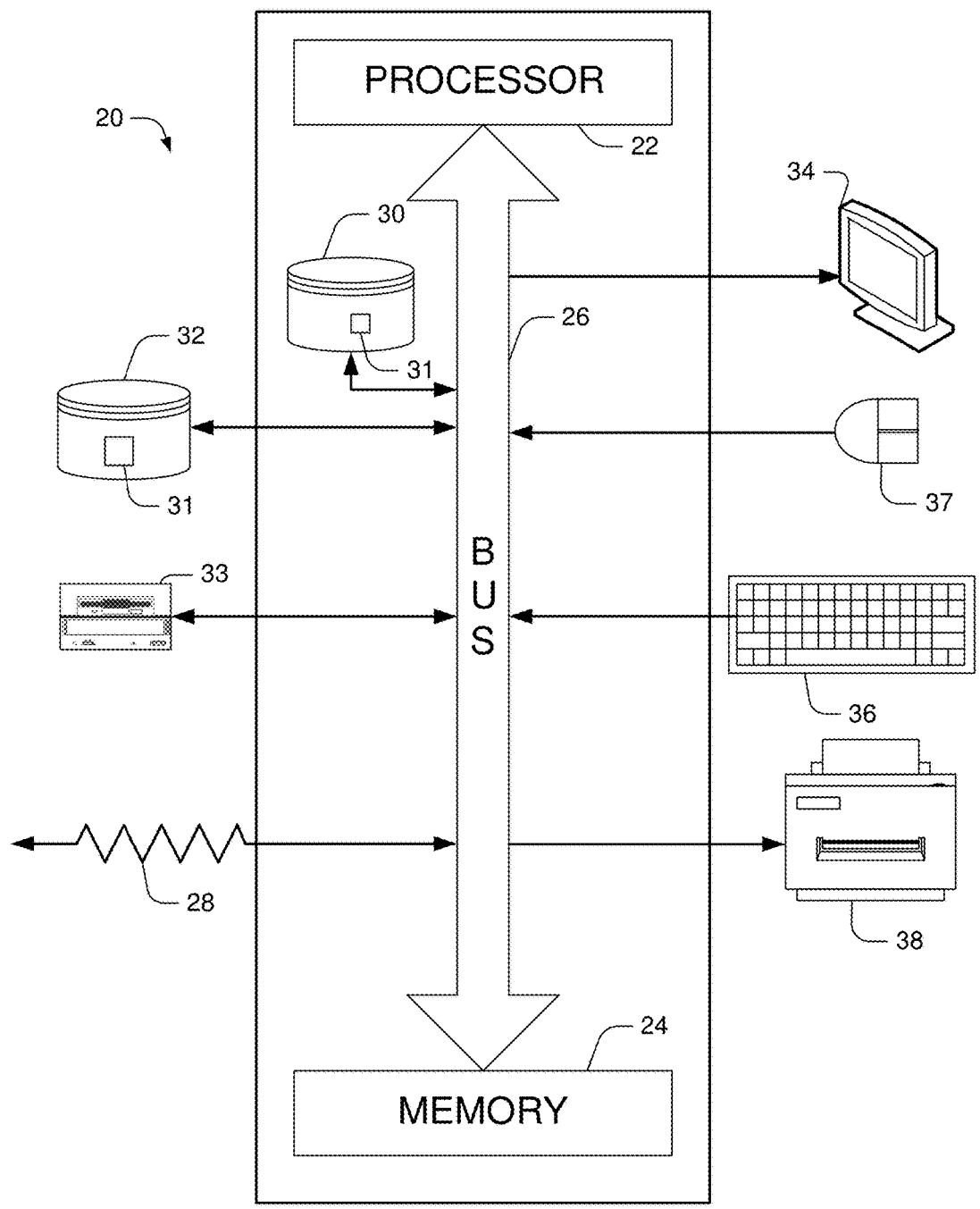
FIG. 6 is a block diagram illustrating a General Purpose Computer, such as utilized for calculating Home Data Indices, in accordance with the present invention.

FIG. 6 is a block diagram illustrating a General Purpose Computer 20, such as utilized for calculating Home Data Indices, in accordance with the present invention. The General Purpose Computer 20 has a Computer Processor 22 (CPU), and Memory 24, connected by a Bus 26. Memory 24 is a relatively high speed machine readable medium and includes Volatile Memories such as DRAM, and SRAM, and Non-Volatile Memories such as ROM, FLASH, EPROM, EEPROM, and bubble memory. Also connected to the Bus are Secondary Storage 30, External Storage 32, output devices such as a monitor 34, input devices such as a keyboard 36 with a mouse 37, and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such operating systems, utilities, user programs, and software to calculate Home Data Indices can be stored in a Computer Software Storage Medium, such as memory 24, Secondary Storage 30, and External Storage 32. Executable versions of computer software 33, such as defragmentation software and operating systems can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Those skilled in the art will recognize that modifications and variations can be made without departing from the spirit of the invention. Therefore, it is intended that this invention encompass all such variations and modifications as fall within the scope of the appended claims.

REFERENCES

[1] Bailey, M. J., Muth, R. F., and Nourse, H. O. "*A Regression Method for Real Estate Price Index Construction*," Journal of American Statistical Association, 58, pp. 933-942, 1963.

[2] Calhoun, C. A. "*OFHEO House Price Indexes: HPI Technical Description*," OFHEO Technical Report, 1996.

[3] Case, K. E., Shiller, R. J. "*Prices of single-family homes since 1970: new indexes for four cities*," New England Economic Review, pp. 45-56, 1987.

[4] Wang, F. T. and Zorn, P. M "*Estimating house price growth with repeat sales data: What's the aim of the game?*," Journal of Housing Economics, 6, pp. 93-118, 1997

What is claimed is:

1. A method of providing a home data index model in real-time, the method comprising:

selecting a model from a plurality of possible models stored in a memory, the selected model having the smallest relevant geographic resolution with the most specific cost constraints specific to a particular user, wherein the most specific cost constraints are stored in memory and include spatial resolution, data time lag resolution, sale value stratification organized across a plurality of different tiers and property sale type separated across a plurality of different sale transactions each having a set of characteristics;

performing a first accuracy test for the selected model to determine accuracy of the selected model against an accuracy threshold criteria;

performing a second accuracy test, the second accuracy test determining the accuracy of generalized characteristics of the selected model;

verifying that all values have been processed through the first accuracy test and second accuracy test; and providing the home data index model in real time based on the processed values stored in memory, wherein the method is processed as a result of a processor executing instructions stored in the memory.

2. The method in claim 1, further comprising, after performing the second accuracy test but before the verification step, a step of repeating the first accuracy test and the second accuracy test with a new selected model having a higher relevant geographic resolution, the repeating being performed based on a result from the first accuracy test and the second accuracy test.

3. The method in claim 2, further comprising, after the first accuracy test but before the second accuracy test, a step of generalizing cost constraints for the selected model before performing the second accuracy test.

4. The method in claim 2, wherein the new selected model has a more specific cost constraints.

5. The method in claim 1, further comprising, after the first accuracy test but before the second accuracy test, a step of selecting an alternative model as the selected model with a higher relevant geographic resolution before generalizing cost constraints.

6. A system for providing a home data index model in real-time, the system comprising:
   a processor; and
   memory storing instructions executable by the processor to:
     select a model, from a plurality of possible models stored in a memory, the selected model having a smallest relevant geographic resolution with a most specific cost constraints specific to a particular user, wherein the most specific cost constraints are stored in memory and include spatial resolution, data time lag resolution, sale value stratification organized across a plurality of different tiers and property sale type separated across a plurality of different sale transactions each having a set of characteristics;
     perform a first accuracy test for the selected model to determine accuracy of the selected model against an accuracy threshold criteria;
     perform a second accuracy test for the selected model to determine accuracy of generalized characteristics of the selected model;
     verifying that all values have been processed through the first accuracy test and the second accuracy test; and
     providing the home data index model in real-time based on the processed values stored in memory, wherein the model is selected, the first and second accuracy test is performed and the verification that all values have been processed are performed as a result of a processor executing instructions stored in the memory.

7. The system in claim 6, wherein the instructions stored in memory and executed by the processor further include after performance of the second accuracy test but before the verification step, a step for repeating the first accuracy test and the second accuracy test with a new selected model having a higher relevant geographic resolution, the repeating being performed based on the result from the first accuracy test and the second accuracy test.

8. The system in claim 7, wherein the instructions stored in memory and executed by the processor further include after performance of the first accuracy test but before the second accuracy test, a step of generalizing cost constraints for the selected model before performing the second accuracy test.

9. The system in claim 7, wherein the new selected model has a more specific cost constraints.

10. The system in claim 6, wherein the instructions stored in memory and executed by the processor further include after performance of the first accuracy step but before the second accuracy step, a step for selecting an alternative model as the selected model having a higher relevant geographic resolution before generalizing cost constraints.

11. A computer readable medium containing a set of instructions executable by a processor for providing a home data index model in real-time, said set of instructions comprising:
   selecting a model, from a plurality of possible models stored in a memory, the selected model having a smallest relevant geographic resolution with a most specific cost constraints specific to a particular user, wherein the most specific cost constraints are stored in memory and include spatial resolution, data time lag resolution, sale value stratification organized across a plurality of different tiers and property sale type separated across a plurality of different sale transactions each having a set of characteristics;
   performing a first accuracy test for the selected model to determine accuracy of the selected model against an accuracy threshold criteria;
   performing a second accuracy test, for the selected model to determine accuracy of generalized characteristics of the selected model;
   verifying that all values have been processed through the first accuracy test and the second accuracy test; and
   providing the home data index model in real-time based on the processed values stored in memory, wherein the model is selected, the first and second accuracy test is performed and the check for additional values is processed as a result of a processor executing instructions stored in the memory.

* * * * *